United States Patent [19]

Nichol et al.

[11] Patent Number: 4,885,707
[45] Date of Patent: Dec. 5, 1989

[54] VIBRATION DATA COLLECTING AND PROCESSING APPARATUS AND METHOD

[75] Inventors: Robert E. Nichol; Robert B. Grant; Charles T. Faddis, all of Bainbridge Island, Wash.

[73] Assignee: DLI Corporation, Bainbridge Island, Wash.

[21] Appl. No.: 16,272

[22] Filed: Feb. 19, 1987

[51] Int. Cl.$^4$ .............................................. G06F 15/46
[52] U.S. Cl. ................................ 364/551.01; 73/660; 364/508; 235/375
[58] Field of Search ................ 364/508, 550, 551.01, 364/551.02, 574.04; 73/660, 652; 340/683; 235/462, 375, 376

[56] References Cited

U.S. PATENT DOCUMENTS

| | | | |
|---|---|---|---|
| Re. 31,750 | 11/1984 | Morrow | 364/508 |
| 3,913,084 | 10/1975 | Bollinger et al. | 340/683 |
| 4,116,052 | 9/1978 | Paluka | 73/117.3 |
| 4,184,205 | 1/1980 | Morrow | 364/508 |
| 4,280,185 | 7/1981 | Martin | 364/506 |
| 4,312,232 | 1/1982 | Stoutenburg | 73/659 |
| 4,322,976 | 4/1982 | Sisson et al. | 73/659 |
| 4,399,513 | 8/1983 | Sullivan et al. | 364/551 |
| 4,408,285 | 10/1983 | Sisson et al. | 364/508 |
| 4,417,336 | 11/1983 | Weilbacker | 371/20 |
| 4,425,798 | 1/1984 | Nagai et al. | 73/660 |
| 4,426,641 | 1/1984 | Kurihara et al. | 340/683 |
| 4,429,578 | 2/1984 | Darrel et al. | 73/659 |
| 4,488,240 | 12/1984 | Kapadia et al. | 364/508 |
| 4,507,705 | 3/1985 | Hoshino et al. | 361/283 |
| 4,520,674 | 6/1985 | Canada et al. | 73/660 |
| 4,535,411 | 8/1985 | Blackburn et al. | 364/508 |
| 4,612,620 | 9/1986 | Davis et al. | 364/551 |
| 4,764,879 | 8/1988 | Campbell | 364/482 |
| 4,800,512 | 1/1989 | Busch | 364/551.01 |

OTHER PUBLICATIONS

*Computerized Predictive Maintenance–a Spectral Approach*, Vibration Specialty Corporation: Aug. 1986, Vibration Institute Seminar in Houston, Texas, pp. 167–176.

*The Most Sophisticated Equipment for Predictive Maintenance*, Vibration Specialty Corporation, Mar. 1986, 2 pages.

(List continued on next page.)

*Primary Examiner*—Parshotam S. Lall
*Assistant Examiner*—S. A. Melnick
*Attorney, Agent, or Firm*—Larry A. Jackson

[57] ABSTRACT

In a system for predictive maintenance of machinery based on vibration data history, a portable battery operated vibration data collector and processor unit (10) is equipped with an electro-optical wand (18) for reading a bar code affixed to each data collection station (22) on the machinery that is to be tested. The vibration of the machinery is sensed by electro-mechanical transducers (16) temporarily attached by an operator to permanent indexing mounts (24) at each test station. The bar code (26) identifies the station and automatically initiates a predetermined sequence of vibration data collection, processing and data storage operations. Within the portable unit there are four modules (or boards) interconnected by a serial data bus and unique input/output interface: a central control module (board C) is the brain of the system and initiates data collection in response to the bar code reader and determines the operating sequence of the other modules; an analog-to-digital conversion module (board A) conditions analog signals received from the transducers and converts same to digital time domain data; a fast Fourier transform (FFT) module (board F) receives the digital time domain vibration data and converts it into frequency domain vibration data; and a mass memory module (board D) receives and stores the frequency domain data. When data has been collected from a number of stations, the stored frequency domain data is transfered (uploaded) from the portable unit via a charger/interface (12) into a host computer (14) where the data is further processed to support predictive maintenance scheduling.

7 Claims, 11 Drawing Sheets

OTHER PUBLICATIONS

Robert L. Remillard, "Data Management Systems for Predictive Maintenance Programs", Sound and Vibration, pp. 20-24, Sep. 1985, U.S.A.

K. R. Peity and E. F. Pardue, "Predictive Maintenance Programs for the Power Generation Industry", *Sound and Vibration,* Jun. 1986, U.S.A., pp. 18-21.

W. J. McGuckin and E. J. Schramm, "Diagnostic Analysis of Machinery with State of the Art Equipment", *Sound and Vibration,* Jun. 1985, U.S.A, pp. 6-8, 10.

TEC Model 1310, Technology for Energy Corporation, date unknown, U.S.A., 2 pages.

*Comprehensive Predictive Maintenance System,* Palomar Technology International, date and place of publication unknown, 1 page.

*Model 818 Machinery Maintenance Data Collector,* IRD Mechanalysis, date and place of publication unknown, 3 pages.

M. D. Hicho, "Six Steps to Reducing Machinery Maintenance Costs", reprint from C.P.E. & C.N., 2 pages.

Chapters 1, 2 and 3, Vibration Specialty Corporation (VSC)—Jul. 1986, "ViB® Spectrum Processor for Computerized Vibration Analyser" Instruction Manual, Version III.

Hegner et al., "On-Line Machinery Measurement and Recording System", ISA Transactions, vol. 17, No. 1, pp. 41-47.

VIBRATION DATA COLLECTING AND PROCESSING APPARATUS AND METHOD

BACKGROUND OF THE INVENTION

The invention relates to equipment and methods for monitoring the condition of machinery by sensing the amplitude (level) and frequency (rate) of machine vibrations and processing the collected vibration data.

Vibration is produced by moving parts of machinery due to causes like unbalance, misalignment of shafts and worn out bearings. Every machine has reasonable levels of vibration that are characteristic of its operation. Excessive levels of vibration indicate machine problems which may lead to unsatisfactory operation and eventual breakdown.

Machine malfunction can sometimes be detected by a change in the audible noise pattern of that machine. Many good mechanics can listen to the operating noise of a machine and thereby pinpoint the source of the problem. In today's plants where machines are complex and/or large in number, engineers rely on more advanced methods of identifying abnormal levels and patterns of vibration (which is heard as noise) in order to determine the condition of a machine. It is now common to measure the level and rate of the vibrations of machines and use this data to determine which machines require servicing. This more reliable monitoring technique is called predictive maintenance.

To properly employ predictive maintenance, vibration data is taken and recorded on a scheduled basis during normal use of the machinery. There are a number of systems available for this purpose. Most are highly complex electronic systems that involve numerous operating steps of an exacting nature and therefore require well trained operators. Such existing equipment usually has a variety of dials and/or keys that must be operated in a certain order. Often the operator must take notes such as the identification of the machine, settings of switches and dials, or of the data collection station on the machine. Even when used by skilled operators, such systems are prone to human error which can result in unnecessary maintenance, or worse yet, the failure to predict major breakdowns. As explained more fully in the detail description, most existing portable vibration data collectors direct the operators to successive machines on a preprogrammed "paper route", with the next machine location displayed on the portable unit. This discourages the operator from choosing an optimum route. Also, some prior collection systems discussed herein permit the operator to enter setup data for each machine station, introducing the possibility of human error, compared to a device that retrieves preloaded data collection setup parameters from memory.

SUMMARY

The vibration data collector and processor of the present invention is a portable, battery operated unit 10 containing stored program microprocessors and associated circuitry to record and process vibration data in a manner that significantly minimizes the possibilities for operator error.

An optical bar code reader is used for reading a bar code label that is affixed to each data collection station on the machine to be tested and a valid bar code read initiates automatic data collection and data processing operations. The bar code label identifies the station and causes retrieval of predetermined data collection and data processing parameters (machine file) unique to that station, which have been preloaded into the portable unit from the host computer. Vibration of the machinery is sensed by transducers (specifically, accelerometers) and analog voltage signals are transmitted to the portable unit through a connecting cable.

In the preferred embodiment disclosed below, there are four modules or boards that execute different functions (see FIG. 2). The central control module (board C) is the brain of the system. When alerted by a signal sent from the manual push button switch (18a) on the bar code reader wand (18), a central microprocessor on board C turns all modules (boards) on and dispatches commands to them in a certain order. Signals received from the bar code reader are converted to ASCII characters by hardware on this board. Based on the identification code read, data collection parameters (machine file) for the particular station are retrieved from a nonvolatile memory on board (C). The analog-to-digital conversion module (board A) is instructed by the central microprocessor to start collecting data using these predetermined data collection parameters.

Analog-to-digital conversion module (board A) receives raw vibration signals from the transducers. These signals, measured as time domain acceleration are conditioned by first converting same to velocity by electrical integration, automatically adjusting gain for maximum dynamic range, low pass filtering to eliminate frequency aliasing due to digital sampling, and then converting these signals from analog to digital form.

A fast Fourier transform (FFT) module (board F) receives the digital time domain vibration velocity data and converts them into frequency domain using stored program microprocessing. The resulting frequency domain data is then sent to a mass memory for storage.

Memory module (board D) is made up of dynamic random access memories (DRAMs) and receives and stores, for the duration of battery charge, the frequency domain data from the FFT board F. Also, in the preferred embodiment these same DRAMs serve as temporary storage of the digitized time domain velocity data prior to conversion of that data to the frequency domain by board (F).

The separate modules or boards each have their own local control microprocessor with stored program read only memory (ROM). Boards (A), (C) and (F) also have scratch pad random access memory (RAM). Each module (board) is thus capable of independently carrying out its respective operation when commanded by the central control board (C). A special input/output serial interface (SIO) couples control and data signals to and from the boards via a single conductor serial bus.

When data collection is completed, the frequency domain data stored in the board D DRAMs are transferred to a host computer via a charger/interface unit that includes a battery charger for maintaining an adequate charge on the portable unit's battery pack. An additional module, called the base board, in the charger/interface of the preferred embodiment establishes communication via the SIO between the host computer and portable unit 10 for uploading collected vibration data and for downloading of machine file data.

These and further features, objects and advantages of the invention will become apparent to those skilled in the art from the following detailed description and appended drawings.

DETAILED DESCRIPTION

Figure 1:
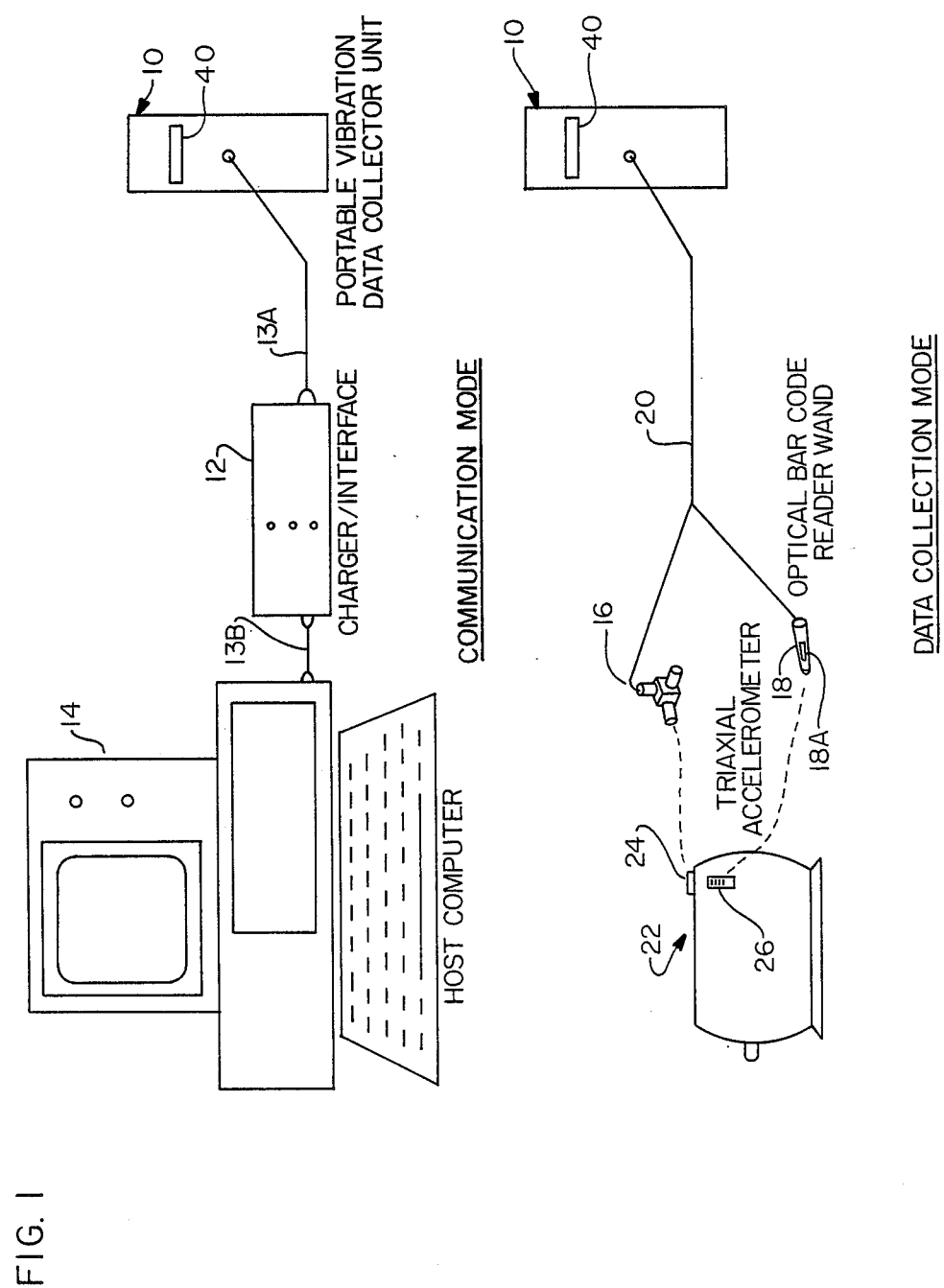
FIG. 1 is a pictorial representation of the portable vibration data collection and processing apparatus as used in a predictive maintenance system and is shown to include a communication mode in which the portable unit receives machine file data from a host computer and subsequently returns collected vibration data to the computer for predictive maintenance analysis; and a data collection mode in which the portable apparatus is used in the field to collect, process and store vibration data from a plurality of machines in a predictive maintenance program.

The portable vibration data collection and processing apparatus of the invention is shown in FIG. 1 in two different modes of operation. Initially, the portable unit 10 is connected through a charger/interface 12 via cables 13a and 13b to a host computer 14 for charging batteries and downloading machine file data to a non-volatile memory in unit 10 that stores vibration data collection parameters for the various machine test stations in accordance with a predictive maintenance program. After charging and initializing unit 10 in this manner, it is disconnected from the charger/interface 12 and prepared for use in the field.

To collect vibration data, the vibration sensing transducers in the form of a triaxial cluster of accelerometers 16, and an electro-optical bar code reader wand 18 are connected to unit 10 via cable 20. The operator carries unit 10, accelerometer cluster 16 and bar code reader 18 to each of a plurality of machine test stations 22 listed in the predictive maintenance program. Each machine station 22 has a sensor indexing mount 24 preaffixed, such as by an epoxy adhesive, to the machine at the desired data collection point. Adjacent to mount 24, a bar code label 26 is similarly affixed to the machine. A machine may have a plurality of such data collection stations 22 each with a separate indexing mount 24 and a bar code 26.

The operator first attaches the accelerometer cluster 16 to the indexing mount 24 by means of a captive screw within accelerometer cluster 16 (see FIG. 3), operates button switch 18a on wand 18 and then scans the bar code 26 with the wand to automatically identify to unit 10 the particular data collection station 22. Bar code 26 causes unit 10 to access the corresponding machine file data that was preloaded into a memory of unit 10 from host computer 14 during the communication mode.

The scanned bar code is compared with stored machine IDs and, as described in greater detail below, a valid read by wand 18 and unit 10 initiates data collection and processing of data. Analog vibration signals are coupled into unit 10 via cable 20, integrated, filtered and converted to digital time domain data representing velocity. The digital time domain data is then transformed by fast Fourier processing from time domain into frequency domain and stored in a dynamic random access memory within unit 10. The operator will usually collect data from a number of machines, and in doing so he may proceed to any machine and to any machine station 22 thereon in any desired order. After completing a round of data collection, such as at the end of a shift, the operator returns portable unit 10 to the location of host computer 14, disconnects the accelerometer and bar code reader cable 20, attaches charger/interface cable 13b and uploads the collected frequency domain vibration data to permanent data storage within host computer 14. Subsequently, the transferred vibration data is processed and analyzed in host computer 14 to support the predictive maintenance program. The results are made available on the computer's video display and/or printer (not shown) and are used for determining appropriate maintenance scheduling.

Figure 2:
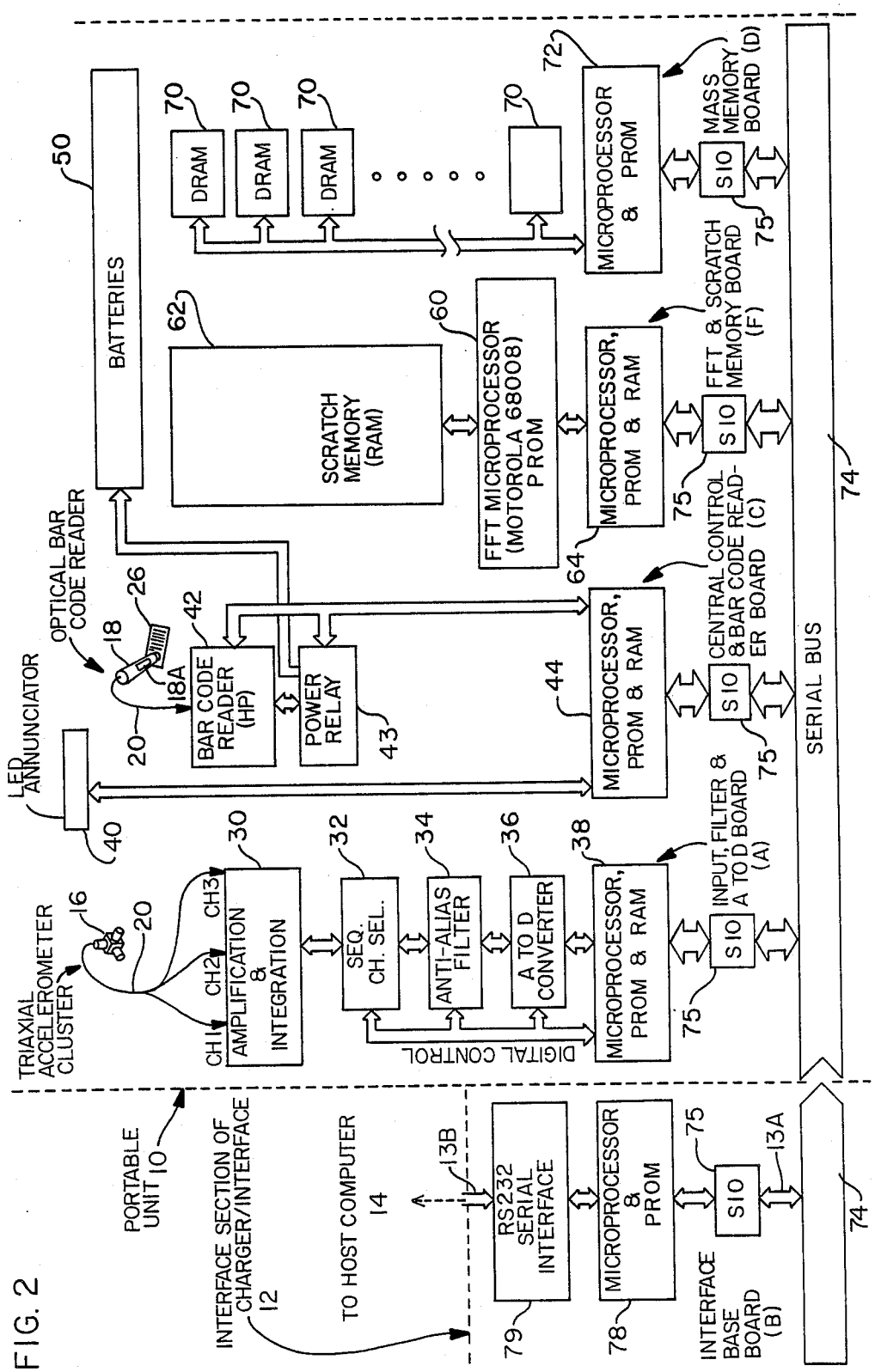
FIG. 2 is a block diagram of the portable apparatus which includes accelerometer transducer and optical bar code reader inputs, and a plurality of microprocessor controlled modules (or boards) interconnected by a common serial bus.

As shown in FIG. 2, the portable unit 10 is made up of four functional modules or boards:
Signal Conditioning Including Analog to Digital Conversion (Board A)
Central Control and Bar Code Reader (Board C)
FFT Processing (Board F)
Mass Memory (Board D)

Each of the four boards comprises an assembly of signal, memory and microprocessor circuitry including stored program read only memory (ROM) for determining, in part, the module's operation. The operating sequence of the boards is controlled by communication between the central control microprocessor on board C and a local microprocessor on each of boards A, F and D that is dedicated to control and supervision of the functions of that module.

As each functional module or board is needed by the portable unit 10, it is activated by the central control processor of board C and commanded to execute its dedicated function. When the functional module has completed its task, it is turned off by the central control processor of board C. In most cases, the central control processor actually switches off the battery power supply to that board, thereby conserving electrical power within the portable unit. The separate functions of these modules are described in the following sections.

Signal Conditioning/Analog-to-Digital Board A

Board A, shown in FIG. 2, contains an amplification and integration circuit 30, a sequential channel selection multiplexer 32, anti-aliasing filter 34, A-D converter 36 and microprocessor 38. Included within the functional block for microprocessor 38 are a read only memory in the form of a PROM for storing the board A control program, and a random access memory or RAM for transitory (scratch pad) data storage.

Together these components of board A perform the following functions:

supply excitation current to the vibration transducers check short/open circuits to transducers amplify the vibration signals from the vibration transducers check signal amplitudes and switch the analog amplifier gain to maximize the signal-to-noise ratio and dynamic range electrically integrate the analog vibration signals received from the accelerometer transducers to convert these signals to represent vibration velocity select the analog signal channel(s)

provide selectable corner frequency low-pass anti-alias filtering of the analog signals convert the analog velocity signals into equivalent digital signals transfer the digitized vibration signals to the FFT processing board F First, this board A tests for short and open circuits of each of the three channels of transducer sensor wiring. Reliable data collection requires that the sensors and their wiring to unit 10 are in satisfactory electrical condition. Under control of its local microprocessor (such as an 80C31) and prior to each data collection operation, the board A examines the DC component of the signals from the sensors. If the DC component of the signals is found to be too near the "+" supply rail, the circuit is deemed to be open. Conversely, if the DC component of any signal is too near the ground rail, the sensor circuit flags short. If the test indicates either an open or short circuit condition, the identification of the abnormal state is relayed to the central control board C via the serial bus 74 for causing an annunciator 40 on unit 10 to display the message "CABLE".

Figure 5:
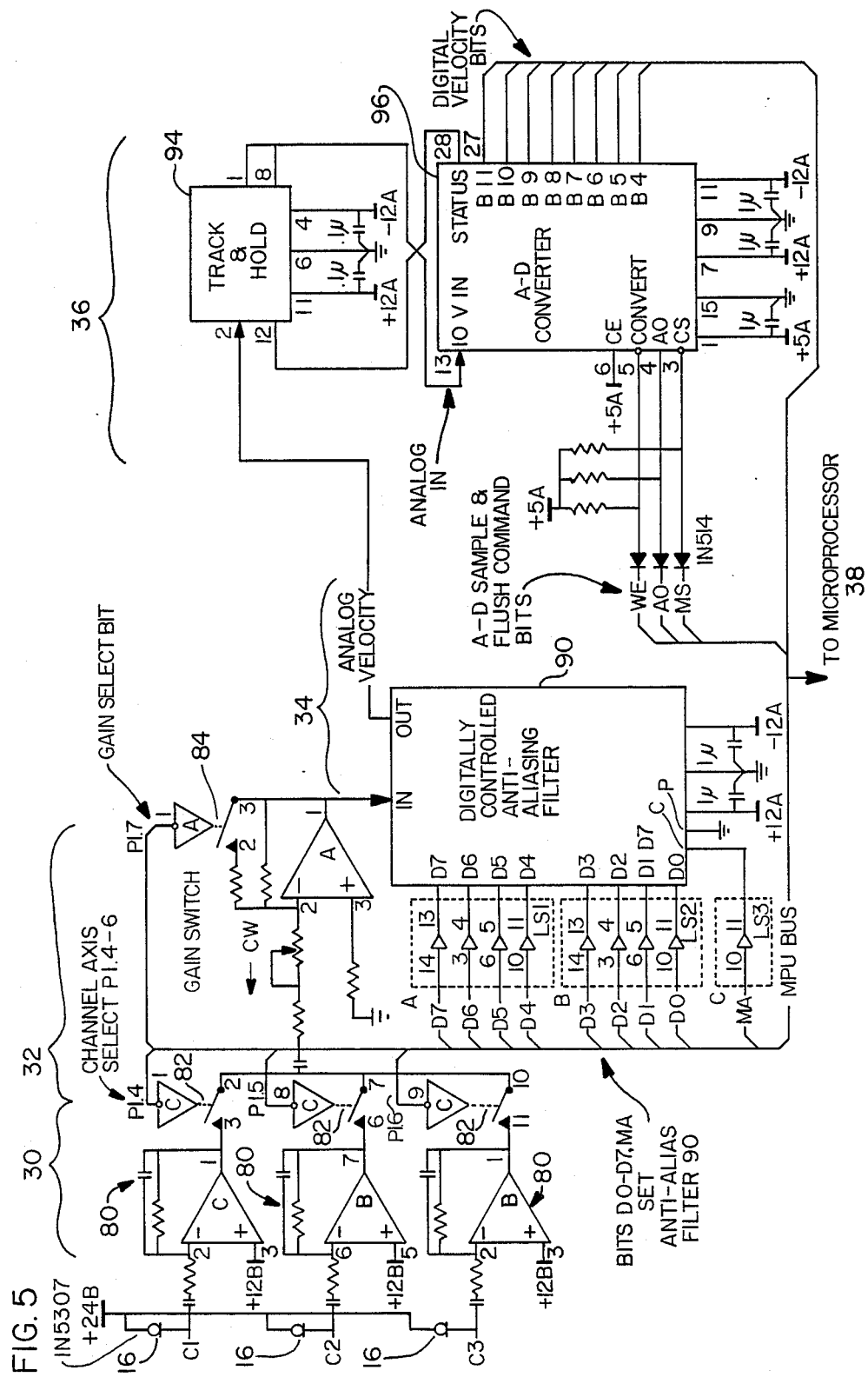
FIG. 5 is a schematic and block diagram of the signal input and conditioning portions of board (A) of the portable apparatus shown in FIG. 2.

Board A also converts acceleration signals to velocity signals as shown in greater detail by FIG. 5. Output signals from the accelerometers are the electrical analog of vibration acceleration. Because acceleration signals from tested machinery cover a broad dynamic range over the 10 kHz signal bandwidth of portable unit 10, the attainable dynamic range of the portable unit 10 would be unsatisfactory if the sensed vibration signals were processed as acceleration data. Therefore, the analog signals are electrically integrated by integrating amplifier circuits 80 to the electrical analog of velocity prior to digitization. The integrated velocity signal from each sensor channel is selected on a time sharing basis by multiplexing switches controlled by microprocessor control bits P1.4, P1.5 and P1.6 as shown in FIG. 5.

Automatic gain switching of analog amplifiers enhances measurable dynamic range of input signals. Vibration amplitude in machinery covers a wide dynamic range. To enhance the capability of the portable unit to accommodate the wide dynamic range, automatic gain switching of the analog amplifiers is used. At the beginning of each data collection and with the amplifiers initially set to maximum gain, the incoming vibration signals are sampled. If the signal equals or exceeds a predetermined threshold, the amplifier gain is reduced by 20 dB by a gain select bit operating switch 84 as shown in FIG. 5 to change the feedback impedance of the gain amplifier. The appropriate gain setting notation is then attached to the frequency domain "vibration signature" data that is eventually stored in mass memory board D.

Anti-aliasing filter 34 on board A is provided by a digitally set analog filter 90 as depicted in FIG. 5. A plurality of parallel control bits D0-D7 from microprocessor 38 set the frequency limits of filter 90 in accordance with predetermined machine file data preloaded into the board A memory. The output of filter 90 produces the analog velocity signal ready for conversion to digital form.

The analog-to-digital (A-D) conversion on board A uses a track-and-hold circuit 94 as shown in FIG. 5 with an A-D converter 96. Converter 96 allows a dynamic range of 4096:1 (72 dB). When combined with the additional 20 dB of dynamic range that results from the use of switchable gains in the analog amplifier, the result is an overall data acquisition dynamic range of 92 dB.

Sufficient time domain data is collected to enable ensemble averaging of frequency domain data. The ability to collect enough time domain vibration data for eventual averaging of several frequency domain vibration signatures is required to develop consistent, accurate vibration data. To do so, the data acquisition module must be able to acquire enough time domain data for eventual conversion into several sets of frequency domain data that are then averaged together into the final frequency domain result. Under control of its local microprocessor 38, board A acquires as much data for each channel as is needed to meet the needs of however many ensemble averages are specified for each of the vibration pickup locations. The collected time domain data is stored temporarily in the mass memory board D using a unique moving partition scheme that separates stored time domain data from stored frequency domain data as described more fully herein.

Central Control & Bar Code Reader Board C

The central control board C serves as the clearing house for all functions of the portable unit 10. As shown in FIG. 2, board C includes a bar code reader unit 42 connected to optical bar code reader wand 18, a power relay 43, and a central microprocessor 44, which in turn has associated PROM and RAM circuits. LED annunciator 40 is connected to microprocessor 44 as an output display. As used in the portable unit, the central control performs the following functions:

decode bar code symbols sent to it from the bar code reader wand 18 and control power on other modules process the identification numbers read by the bar code wand to determine the required data acquisition mode for each data collection station direct activities of other modules (boards) as dictated by the preloaded data acquisition parameters for each station check the status of the system, e.g.: condition of batteries 50, available memory space, sensor cable condition, etc.

maintain a date/time clock within central microprocessor 44 send system status information to the operator via annunciator 40

The firmware (programming) for unit 10 is distributed among the PROMs, such as a conventional UV-PROM, on each of the four modules (boards). The operating sequence of the modules is determined primarily by firmware stored in the central control board C in the PROM associated with microprocessor 44. Whenever it is necessary to change the operating characteristics of the portable unit 10, such changes can be installed by means of new PROMs with modified stored programs.

System status indication is given to the operator through the LED annunciator 40 by the central control module, board C. When the operator reads a station identification number on bar code 26 with the bar code wand 18, that number is decoded by bar code reader 42 and sent as ASCII characters to the central control microprocessor 44, which looks up the bar code identification number in the preloaded table of machine files. These numbers are stored prior to data collection mode while the portable unit is hooked up to the host computer in the communication mode. Non-volatile RAM, sometimes referred to as NVRAM, associated with microprocessor 44 of FIG. 2 stores the station numbers along with the required parameter settings for data collection at each station. The central control board C then transmits to the other modules the collection parameter settings, including the frequency setting for filter 90 on board A, and initiates the data collection cycle.

Bar codes are interpreted by the bar code reader 42 of central control board C. The bar code symbols are electro-optically readable and represent numbers that uniquely identify each vibration data station 22 on the machinery being tested. There is one identification number for each station.

The use of the bar code identification number is one of the unique features of portable unit 10. Most other portable vibration data collection devices direct the operator to successive machines on a preprogrammed "paper route". In those cases, each pickup station to be tested is displayed in turn on a display panel and the operator must go to that location to collect the data. With portable unit 10, however, the unique bar code identification number at each vibration test station enables the operator to choose the route that is best for the data collection task. He automatically tells the portable unit where he is on the collection route when he scans the bar code label with wand 18.

The bar code together with the preloaded data collection parameters in the non-volatile RAM serves another important function. Most other vibration data collection systems require that the operator input several setup parameters to the unit through a "touch pad" or other manually operated data entry control or device prior to beginning the collection of the vibration data. These human actions are prone to error resulting in inaccurate data collection. Portable unit 10 does not have any operator controls or key board that require manual entry of set up data. Instead, unit 10 retrieves preloaded set up parameters from the non-volatile RAM that are addressed by the bar code ID number. The need for manual controls is eliminated and this frequent cause of error is avoided.

FFT Board F

The FFT board F, as shown in FIG. 2, is built around a high speed math processor 60 such as a Motorola 68008 microprocessor, augmented by a scratch pad RAM 62. It is the function of this microprocessor to transform the time domain vibration signals into the frequency domain. To manage data flow into and out of math processor 60, another microprocessor 64 is provided which includes a PROM for storing a control program and a RAM.

In the present embodiment, time domain data of sufficient quantity for ensemble spectral averaging is collected by the A board and temporarily stored in the DRAM of the D board (described below). When the required amount of time domain data has been collected, it is then transferred to the F board for transformation by the fast Fourier transform. After the data has been thus transformed, it is transferred back to the D board for storage and subsequent uploading to the host computer.

The FFT board F begins its transformation of the time domain data upon receipt of a command to do so from the central control board C. When board F has completed its transformation process, its power is turned off by board C to conserve batteries.

The FFT performed by processor 60 transforms n points (for example n=1024 points) of time domain information into n/2 (eq. 512) points of frequency domain data. The output of the FFT section comprises the amplitudes of the frequency components that were present in the original analog vibration signal.

Mass Memory Board D

The mass memory of board D (FIG. 2) serves to store all of the vibration data that is collected by portable unit 10. The mass memory is provided by a dynamic random access memory (DRAM) 70. To control data flow into and out of DRAM 70, a programmed microprocessor 72, functioning as a memory management microcontroller is provided along with DRAM 70 on board D.

Normally, DRAM 70 is not suitable for battery powered, portable applications because it must be continuously "refreshed" with a dedicated controller to keep it from losing the stored information. Dedicated controllers for DRAM use NMOS technology and are heavy users of electrical power. In the portable unit, however, a CMOS microprocessor 72 such as an 80C31 device has been assigned the role of controlling and refreshing the DRAM. By selective, timed refreshing of the DRAM 70, microprocessor 72 minimizes power requirements, thereby making it practical to use the DAM type of memory.

Another unique feature of mass memory board D is its use as a scratchpad RAM for temporary storage of digitized time domain data that is sent from the signal input board (A). The manner in which the mass memory is used for storage of data from the two boards A and F is unusual and enhances the memory capacity of the portable unit. Time domain data from board A is directed by the memory controller microprocessor 72 to occupy storage locations from the top of the DRAM 70 memory addresses, down. The FFT results from board F are stored in the mass memory DRAM 70 from the bottom of the memory addresses, up. This forms a dynamic partitioning scheme in the mass memory DRAM 70 such that it serves the A and F boards with the maximum possible available space for each module's needs. The boundary between the two "areas" of the mass memory is dynamic. However, as the mass memory of DRAM 70 begins to fill to capacity with the FFT results, space available for temporary storage of digitized time domain data from board A becomes limited by the upper memory address needed for storage of the frequency domain data. When DRAM 70 becomes near full, this condition is detected by central control through board C and it notifies the operator by causing the LED annunciator 40 to display the message "FULL".

SIO Bus

Figure 4:
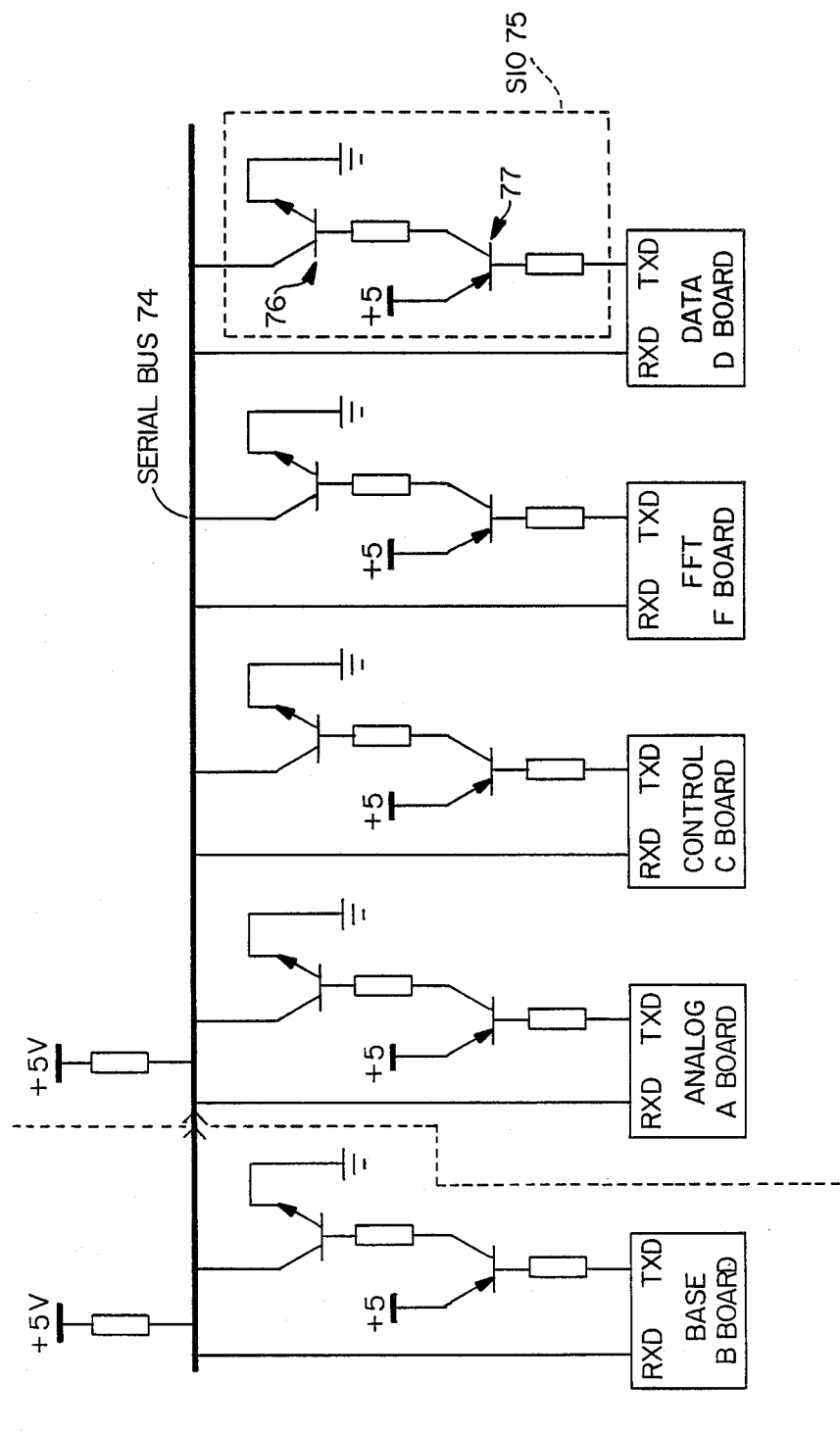
FIG. 4 is a composite block and schematic diagram of the serial bus and input output interface circuit coupling such bus to the individual microprocessor modules or boards.

As shown in FIGS. 2 and 4, the serial bus 74 is a single conductor that, together with a transistor serial input/output (SIO) interface 75 at each board, enables data and control communication between the modules. If, for example, board D in FIG. 4 is to transmit data to board F, it does so through two opposite polarity transistors 76 and 77, one a NPN and the other a PNP type, and a dc supply voltage, here +5 volts. When a 0 bit is to be sent from the TXD terminal on board D, the PNP transistor 77 switches on and converts this to logic 1. At the collector of transistor 77 a 1 bit is fed into the base of NPN transistor 76 which causes it to switch on. This causes the logic to revert to a 0 bit on the serial bus 74. The pair of oppositely poled transistors 76 and 77 provide a buffer between the boards and bus 74 and conserve battery power when the bus is not being used.

Thus binary data is passed from the board to the single serial conductor bus 74. This data stream of 1s and 0s is picked up by all boards at their RXD port by a direct connection to bus 74, but is recognized and acted on by only the target board as determined by address information contained within the elements of the serial bit message, FIG. 8. The single wire bus eliminates costly and bulky switches and wiring connectors to the multiple boards, and, most importantly, conserves power.

Charger/Interface 12

Figure 11:
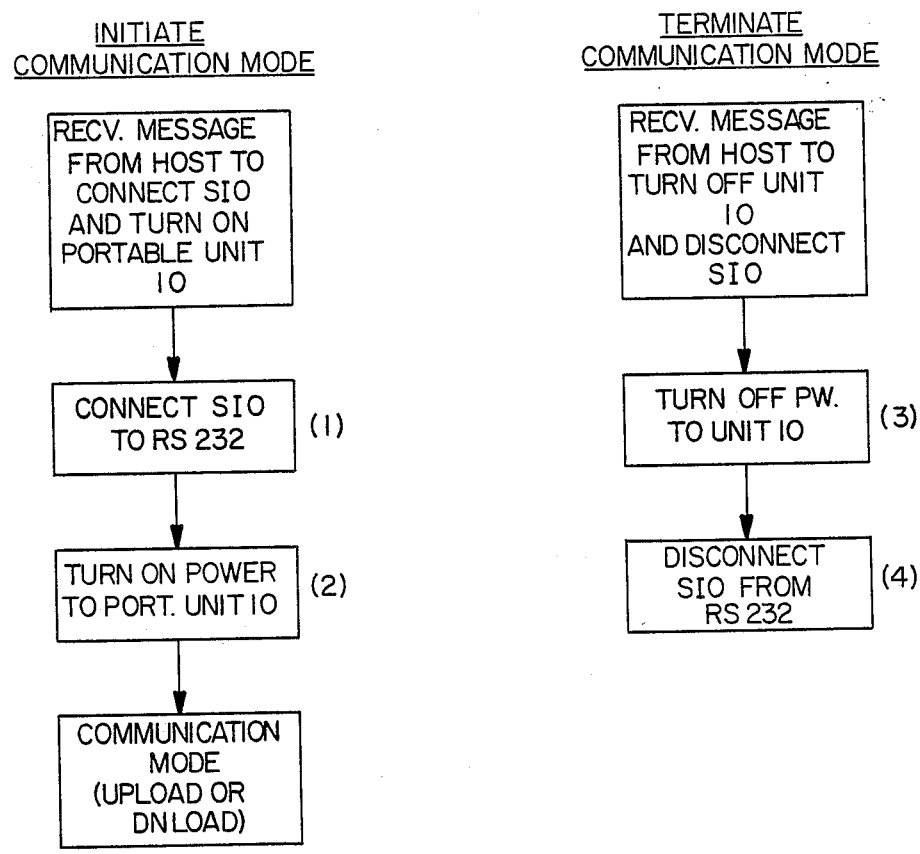
FIG. 11 is a flow chart of the interface base board (B) that functions when portable unit 10 is connected to the host computer 14 to exchange data.

Serial bus 74 also provides a data communication channel between the portable unit 10 and an interface base board B of charger/interface 12, which in turn communicates with the host computer 14 (FIG. 1) via an RS 232 serial interface 79. As shown in FIG. 2, base board B has its own microprocessor 78 for switching on power to portable unit 10 and for enabling data uploading/downloading between host computer 14 and unit 10 in accordance with a stored control program in a PROM that accompanies microprocessor 78. The programmed operation of microprocessor 78 is shown in FIG. 11.

From unit 10, serial bus 74 passes data to and from board B via an SIO 75 that is identical to the SIOs of the other boards described above in connection with FIG. 4. The data link from board B to computer 14 is via an RS 232 serial data interface 79 that includes a logic level shifting circuit for shifting from the SIO 5 volt positive logic (TTL) to the bipolar logic levels of a standard RS 232 serial communication.

As a separate circuit not shown in FIG. 2, charger/interface 12 contains a conventional battery charging circuit that provides charging current to the batteries of portable unit 10 whenever it is connected via cable 13a (FIG. 1).

Programmed Operation of Modules (Boards A, C, F & D) of Portable Unit 10

Figure 6:
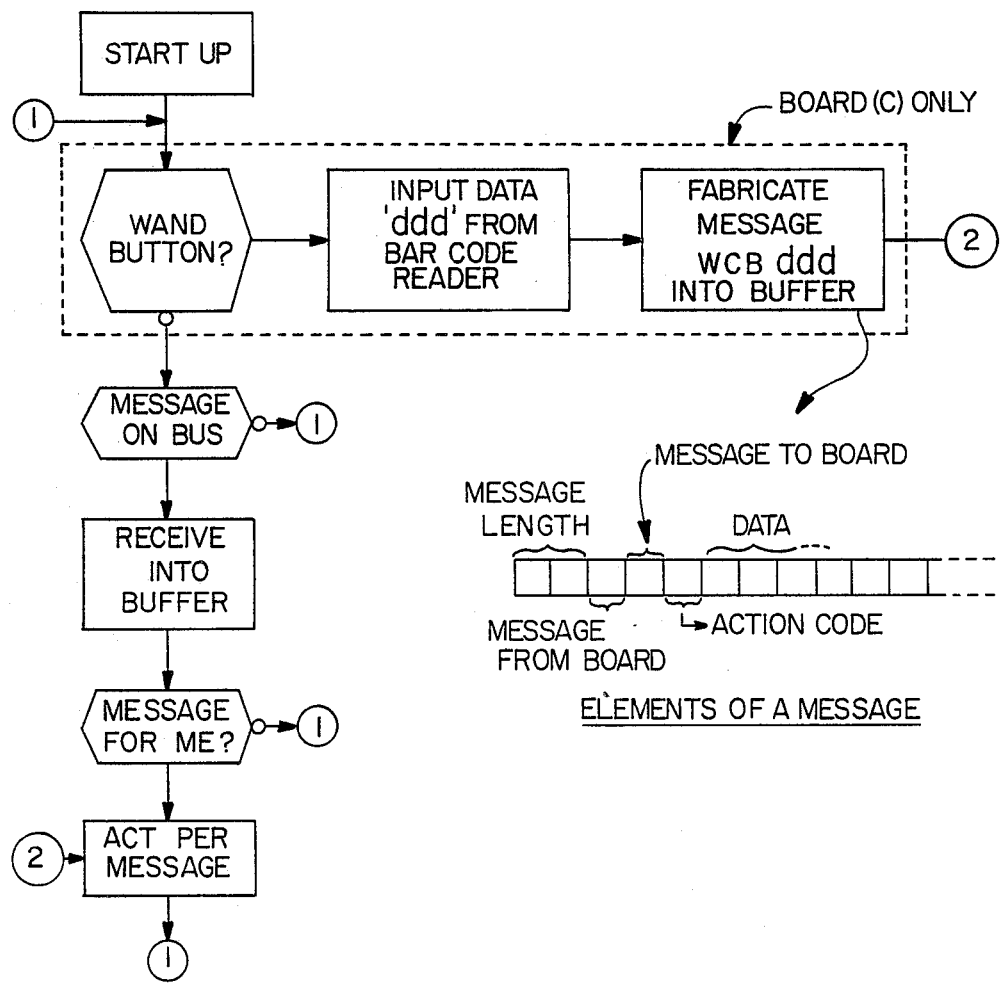
FIG. 6 is a flow chart of a common operating sequence exhibited by each of the microprocessor controlled modules or boards shown in the apparatus of FIG. 2.

All modules (boards) have a similar sequence of actions that they perform (see flow chart in FIG. 6). Once the boards' microprocessor 38, 44, 64 and 72 have been powered up they are in a "listening-in mode" and they are ready to receive commands from other boards. One exception is the central control board C which is the only board that communicates with the wand 18. Board C therefore is triggered into action by depressing a manual key or switch 18a on the bar code reader wand 18.

If a message on the serial bus is not intended for a particular board, no action is taken and the board remains in the "listening" mode. However, if the message is intended for that board then, as shown by the flow chart in FIG. 6, the necessary action commanded by the message is taken, and when accomplished, a completion message is sent back to the board that requested the operation and the board switches back to the listening mode.

Figure 8:
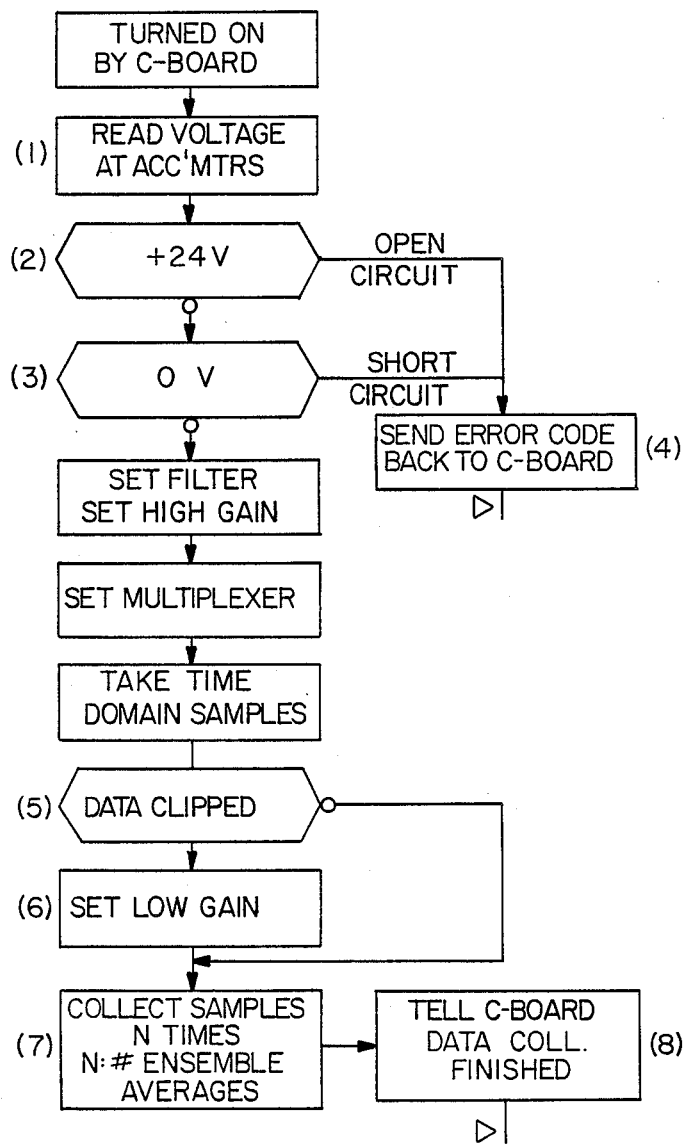
FIG. 8 is a flow chart of the stored program operation of the input, filter and A-D conversion board (A) of the apparatus of FIG. 2.

As shown in FIG. 8, messages communicated between boards consist of a protocol code describing the length of the message, the board sending it, the board it is intended for, and the action requested.

Figure 7:
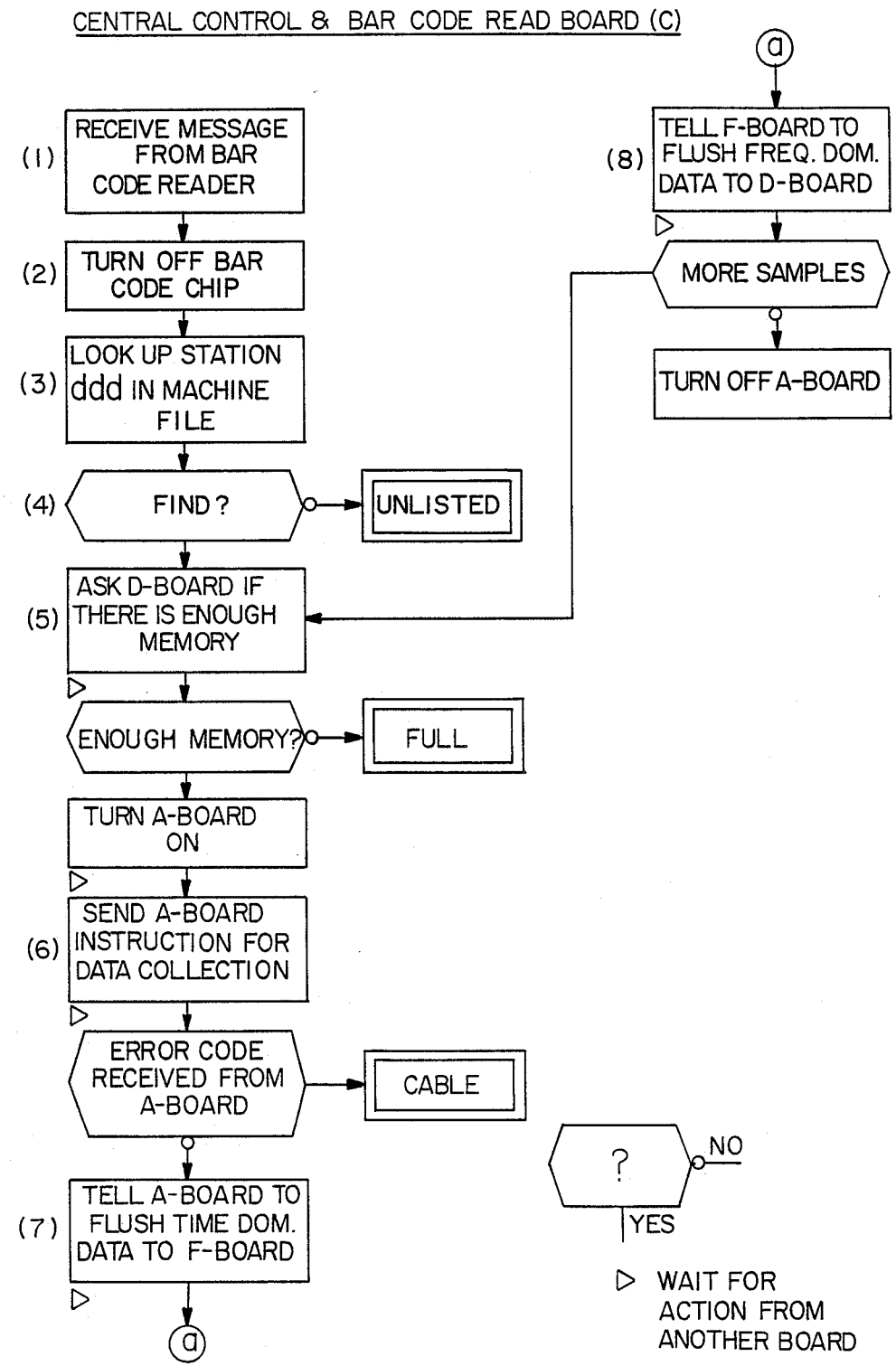
FIG. 7 is a flow chart of the stored program operation of a central control and bar code reader board (C).

The programmed operation of the central control board C is shown by FIG. 7. When the switch 18a on the bar code reader wand 18 is depressed, an infra-red light on the bar code wand is lit and a double coil power relay 43 is activated. The relay 43 powers up the portable unit 10 from enclosed batteries 50. Firmware programming, which is contained in the PROM on board C, causes microprocessor 44 to turn on the bar code reader unit 42.

If the wand 18 does not scan across a bar code label, the microprocessor 44 shuts the system off when switch 18a is released. However, if a bar code label is read and a "valid read" is performed (1), a bar code reader unit 42 converts the bar code message into ASCII characters and uses the RAM in microprocessor 44 for storage during the bar code reading and conversion process. The bar code reader unit 42 is conventional and is available, for example, from Hewlett-Packard Inc. of Palo Alto, Calif. When microprocessor 44 finishes receiving the digital code from the bar code reader unit 42, it shuts off the power to unit 42 to save electrical current (2).

Using the digital code received from the bar code reader unit 42, the microprocessor 44 looks up the code in its nonvolatile RAM (NVRAM) (3). The NVRAM with microprocessor 44 contains the machine file of all stations to be surveyed. The machine file includes a list of instruction parameters pertaining to data collection for that station, such as axis channel(s), sample rate, filter setting and number of required averaged spectral ensembles. This file was previously set in a communication mode using the host computer 14 (FIG. 1). The NVRAM with micro-processor 44 is capable of holding 8 Kbytes of machine file and has an internal battery (not shown) so that the data files contained therein are not erased when the power to the portable unit 10 is turned off, and a realtime clock (also not shown in the drawings) to date/time stamp the collected vibration data.

If a search (4) for a file number in the machine file yields no result, the microprocessor turns on the annunciator 40 and displays the message "UNLISTED" (4). Messages displayed on the annunciator are contained in the firmware stored in the PROM of microprocessor 44. If a file number in the machine file matches the number read and sent by the bar code reader, the microprocessor 44 first checks to see if there is enough memory in the DRAMs of board D to store data and if there is, it then instructs the other boards (A), (F) and (D) to collect (6), process (7) and store data (8).

The programmed operation of signal input board A is shown by the flow chart of FIG. 8. Operations are directed by its local microprocessor 38 using firmware stored in the local PROM (see FIG. 2). Prior to collecting vibration signal data from the accelerometer transducers, the external signal cables 20 are first checked for open (2) or short circuit (3).

If there is an open circuit, the resistance is very high which causes apparent accelerometer signal voltage to rise to near +24 volts, which is the positive voltage rail. If there is a short circuit causing very low resistance, zero voltage which is the ground rail, is detected. When either of these conditions occur, all further operations on board A are halted and board C is advised of the situation which causes the annunciator 40 to display the message "CABLE" (4). Otherwise, data collection starts.

Raw acceleration signals from the accelerometers are first integrated electrically into velocity signals by integrators 80 (FIG. 5). Data channels are then selected by multiplexing switches 82 into a switchable gain circuit 84. If the input signal voltage read is equal to or above the supply voltage, it is said to be "clipped" (5). If the number of clipped data samples exceeds a preset number established in the firmware in microprocessor 38, then the gain provided by circuit 84 is automatically reduced (6) by a switched feedback impedance network as shown.

After short/open check (2), (3) and gain adjustment (5) are completed, input signals are fed into the low pass anti-aliasing filter 90 (FIG. 6). Filtered data is then connected by analog switches 92 into the track-and-hold circuit 94 (FIG. 7). Track-and-hold circuit 94 is a conventional circuit that causes analog input signals to be held at a constant value for a short time so that the conversion processes from analog to digital can be completed.

The output of the track and hold circuit 94 is fed into the analog-to-digital converter 96 (7). Local microprocessor 38 relays a message to the central control board C microprocessor 44 notifying it that the A-D operation has been completed and awaits further commands (8). When the local microprocessor 38 receives command to do so, digitized data are sent to board D for temporary storage and eventual FFT processing.

Figure 9:
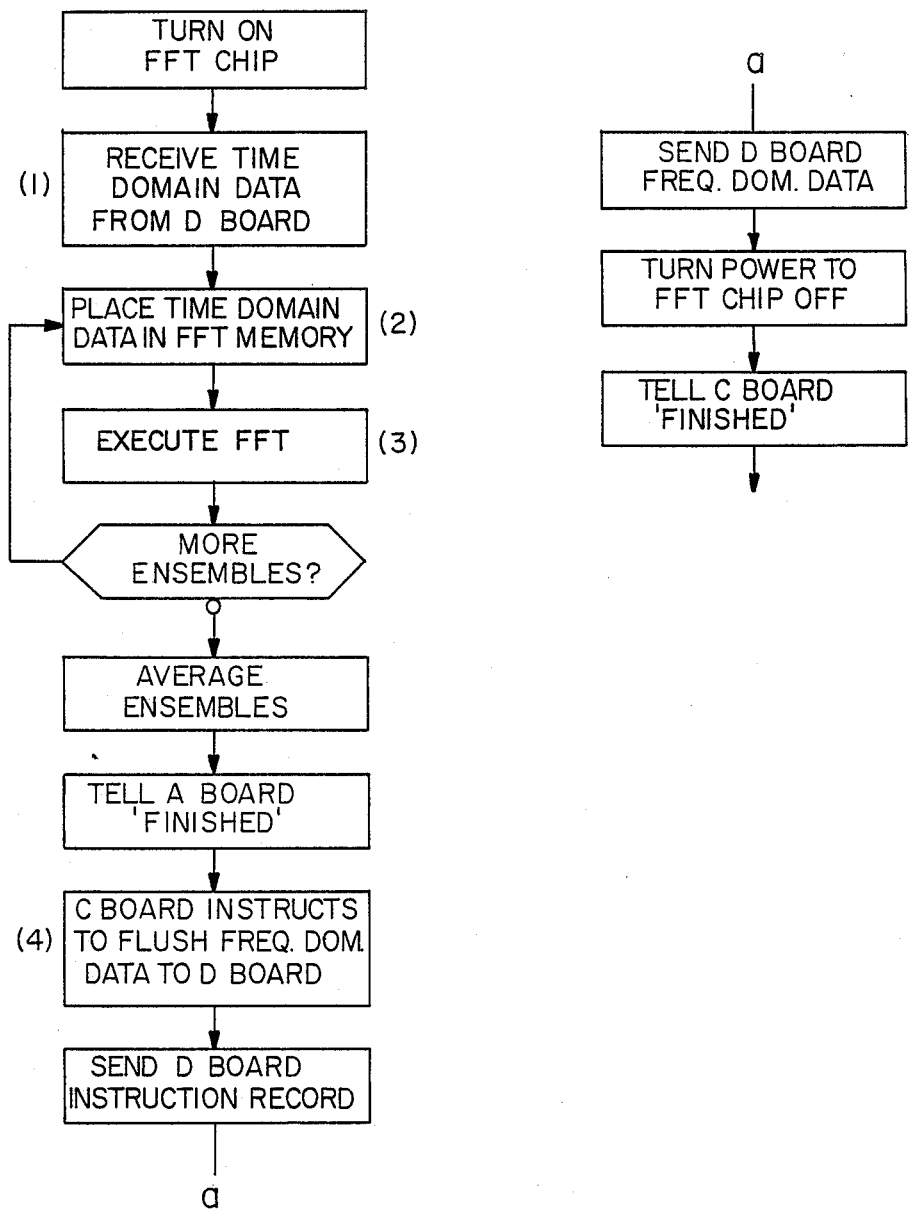
FIG. 9 is a flow chart of the stored program operation of the fast Fourier transform (FFT) and scratch pad memory board (F) of the apparatus of FIG. 2.

The board F programmed operations are indicated by the flow chart in FIG. 9. Principally, board F operates to convert time domain data into frequency domain. The board F is divided into two sections. The FFT section includes microprocessor 60 (Motorola 68008) used for the high speed number crunching needed for FFT processing. The fast Fourier transfer algorithm is resident in a firmware PROM arranged with microprocessor 60. This section uses scratch pad RAM 62 for temporary data storage. Another board section is used for controlling the operations on board F and includes the local microprocessor 64 using firmware resident in the associated PROM. A RAM also accompanies local microprocessor 64 for temporary data storage.

In the flow chart of FIG. 9, as digital time domain data is sent from board D via the serial bus (1), the local microprocessor 64 stores data in the RAM (2) using firmware in the PROM. This temporarily stored data is then passed to the FFT section. High speed microprocessor 60 processes time domain data and converts them into frequency domain data (3).

To calculate the magnitudes of the frequency components, the FFT performs the following operations on the data signals collected by board A:

Calculate the FFT of the time domain information.

From the real and imaginary components of the FFT, calculate the magnitude of the signal vector. Repeat this process for each of n/2 points of the FFT computation. The FFT returns n/2 points in its result, but the upper 18–25% of those points are discarded because their amplitudes are decreased by the anti-alias filter 34 in board A. The magnitudes are calculated as the square root of the sum of the squares of the real and imaginary components.

Repeat the process N times where "N" is the number of averages required by the set up parameters for the vibration station being tested. To compute the ensemble average, sum the results for each line and divide the final sum for each line by N.

Transfer and store the averaged spectral points to the mass memory of board D for eventual transfer to the host computer 14. The algorithms for the FFT computation and the square root extraction that are used by the processor 60 are stored in a PROM with the FFT microprocessor 60.

The frequency domain data resulting from these calculations is then sent back to mass memory board D for storage (4).

Figure 10:
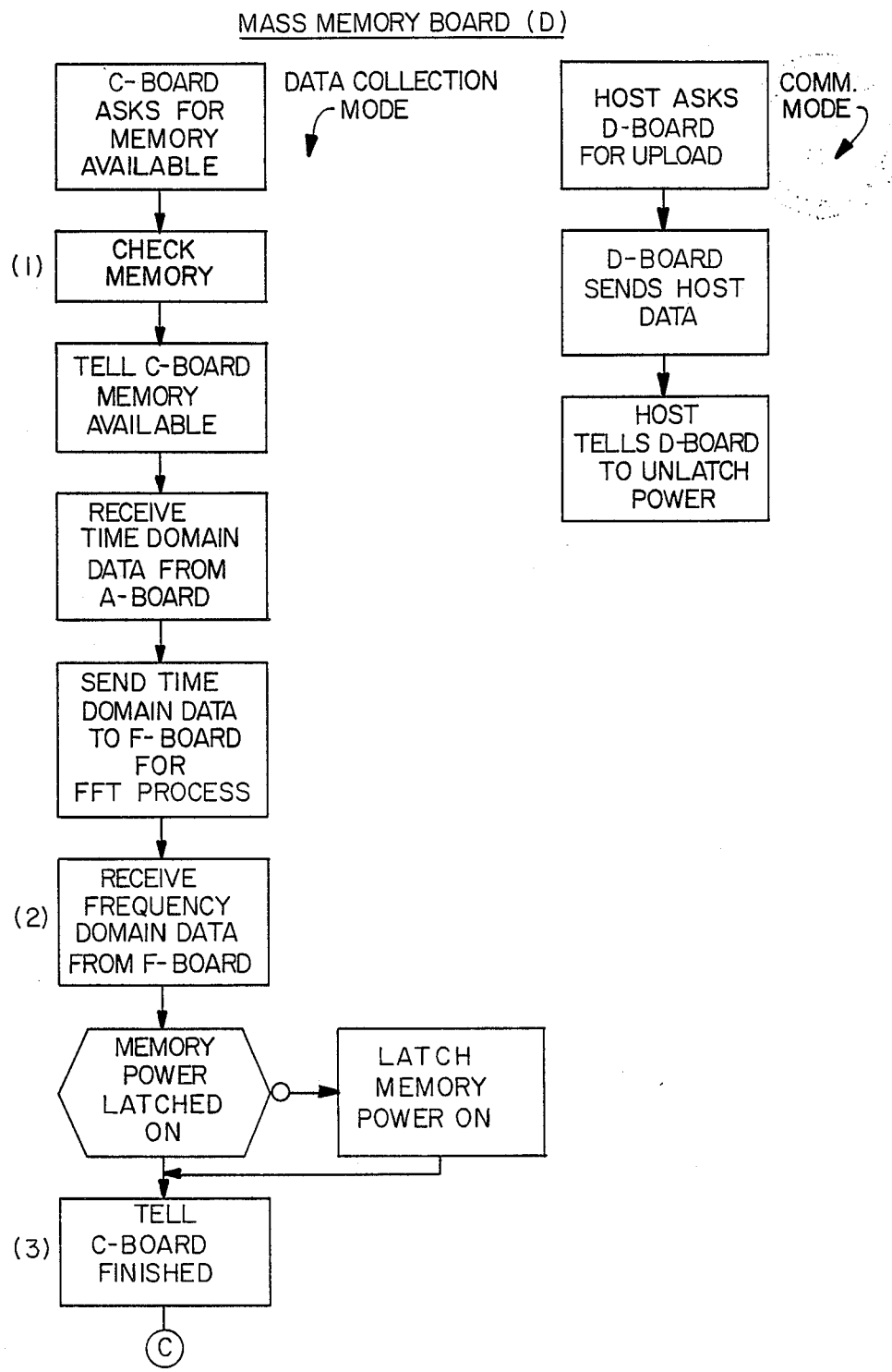
FIG. 10 is a flow chart of the mass memory board (D) of the portable apparatus of FIG. 2 for storing the collected vibration data.

FIG. 10 depicts the programmed operation of board D used for storing both time domain and processed frequency domain data. When the bar code reader reads a valid code, the microprocessor 44 on board C keeps the relay 43 turned on so that all other boards including board D are powered. The microcontroller (provided by microprocessor 72 and associated PROM) controls the operations on board D. It is called a microcontroller instead of microprocessor as it is programmed as a circuit control rather than for data processing. Memory availability is monitored at (1) and data from the F board is loaded at (2). When data loading has been completed, the F board is informed (3). Data stored in the DRAM 70 of board D is available for transfer via serial bus to host computer 14.

The DRAM 70 serves two purposes: (1) temporary "scratch pad" memory for digitized time domain data from the A-D circuitry, and (2) permanent storage of the processed frequency domain data from the F-board FFT processor. Time domain data is sent to the top addresses of the DRAM for temporary storage. The time domain data can be thought of as being held in a "waiting room" in the attic of the DRAM until its turn comes up to be passed into and processed by the FFT processing section of the F-board. After it is passed on to the F-board and transformed into the frequency domain by the FFT processor on the F-board, from which the transformed data is sent to the lowest available permanent storage address on the DRAM D-board. It remains there until it is uploaded from the data collector to the host computer via the interface/charger base unit 12 (or until the batteries that provide life to the portable become too weak to maintain the memory).

The boundary between the two "areas" (attic and permanent storage) of the mass memory is dynamic. When the data collection procedure is first begun, there is maximum area available in the DRAM for temporary storage of the digitized time domain data from the A-D circuitry. As the data collection procedure progresses, the area of the DRAM occupied by processed (frequency domain) vibration data grows from the bottom addresses and there is a decreasing amount of area available for temporary storage of the time domain data. Eventually, there will be insufficient memory space available at the top of the DRAM to accommodate the time domain data for another data collection station. When this condition exists, the C-board controller will indicate that situation to the operator of the instrument via the visual annunciator 40 with the message "FULL".

Programmed Operation of Interface Base Board B

The programmed operation of board B as shown in FIG. 11 receives and executes instructions from host computer 14 to condition this board for passing data to and from the portable unit 10 in the communications mode. The routine on the left of FIG. 11 activates board B (1) and turns on (2) portable unit 10 to enable either downloading or uploading of data. The "power on" message is sent from the host computer via the RS 232 interface. Board B and all other boards receive the message through the level shifting circuit and SIO on the B board. Only the B board responds however, and causes power to be switched on using a conventional transistor switch (not shown) located in the charger-/interface unit 12. Conversely, the right hand of FIG. 11 shows the routine for turning off the power (3) to portable unit 10 in response to that message from the host computer to thereby allow the unit 10 to be disconnected from cable 13a and readied to respond to a bar code input from wand 18.

OVERALL OPERATION OF SYSTEM

The portable unit 10 is the essential element of the predictive maintenance system. As compared to the method of preventive maintenance where all machines are maintained on a regular schedule whether they need maintenance or not, predictive maintenance concentrates on machines that need servicing. This saves valuable time, hence money. Identification of the machines that need maintenance is made possible by regular monitoring of their vibration levels at selected frequencies and comparing these levels with baseline operating mode levels.

Before using the portable data collection and processing unit 10, an engineer must decide which machines are to be monitored. He must next select points, called stations 22, on those machines that would yield the most useful data. The engineer must further determine basic operational and geometric features of the machines he has selected, such as the rotational speed (RPMs), number of teeth in meshing gears, etc. From this evaluation he must select parameters for data collection, such as frequency (analysis) ranges, number of ensemble averages, etc.

Figure 3:
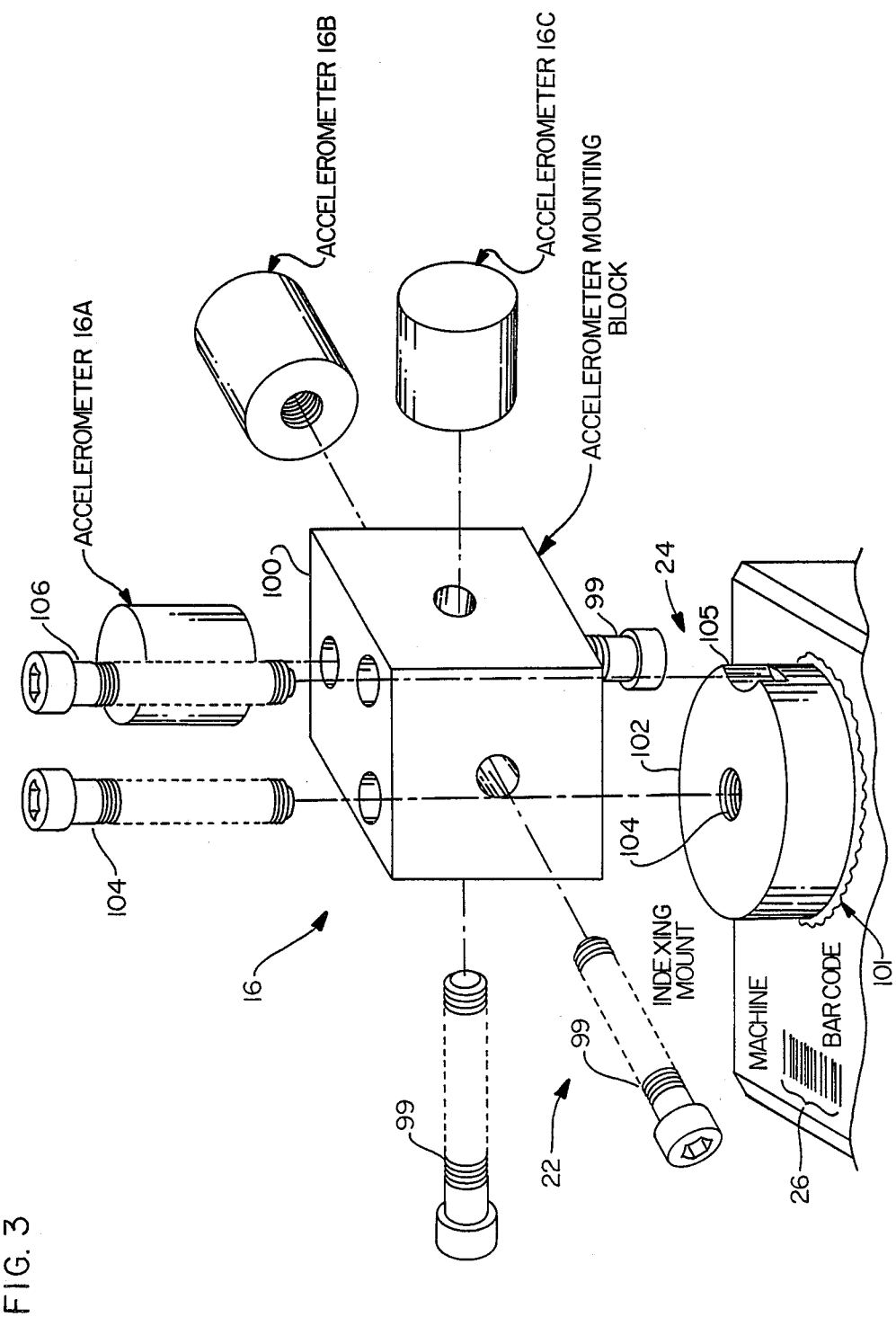
FIG. 3 is an isometric, exploded view of an indexing mount for the accelerometer transducers and shows the bar code affixed to the machine to be tested at the data collection station.

The next step is to affix an indexing mount disk 102 to the machines at each data collection station (FIG. 3). The portable unit 10 interfaces with the machine through the accelerometers 16 which transduce accelerations of the machines into analog voltage signals. As shown in FIG. 3, a plurality of accelerometers 16a, 16b and 16c are attached by mounting bolts 99 to the three orthogonal faces of a small cubical metal block 100 called the mount. The mount and the accelerometers together are called a cluster 16 (or sometimes an array). Cluster 16 is quickly mounted and demounted on the machine by means of a small metal indexing mount disk 102 which is permanently affixed to the machine such as by epoxy adhesive at 101. This disk 102 is called an attachment disk; it plays a major role as an indexing device. The cluster 16 can be attached to the disk in one, and only one orientation by means of a notch 105 on the periphery of disk 102 that cooperates with an indexing screw 106 positioned in a threaded hole through block 100. The block 100 is secured in this indexed orientation by a mounting screw 103 threaded into disk center hole 104. This eliminates errors due to mixing of data collection axes. The engineer also attaches a bar code label identifying each station, adjacent to the indexing disk 102.

After loading the machine files into portable unit 10 from host computer 14 as described above, the operator can collect vibration data from machines at the test stations. This can be performed either by the engineer or by an operator having minimum training. To collect data, the operator must first attach the accelerometer cluster 16 on the indexing disk 102 and then scan the optical bar code reader wand 18 across the bar code label. When a bar code read is complete, the operator's duty is finished. The successful read of the bar code initiates the data collection operation without any further intervention by the operator. As the portable unit 10 does not require the user to do anything other than use the wand 18 to scan bar code labels, the system is virtually error-proof.

The operator cannot mount the cluster 16 incorrectly because of the premounted indexing disk system. He also cannot make errors in the identification of the data collected since he does not have to take notes or manually enter information into the data collector. Data are "stamped" automatically by the portable unit 10 with station identification and date/time information. The operator also does not need to follow a prescribed route as collected vibration data are identified by station numbers without regard to the sequence of a prescribed route.

Following data collection, the processed frequency domain vibration data is transfered to the host computer 14 and analyzed using known predictive maintenance techniques. See for example an article by Robert L. Remillard, "Data Management System for Predictive Maintenance Programs", SOUND AND VIBRATION, September 1985.

Although vibration data is inputted in time domain, it is converted in the portable unit 10 into frequency domain during data collection at each station.

While only a particular embodiment has been disclosed herein, it will be apparent to persons skilled in this field that owing to extensive use of microprocessors together with UVPROMs for stored program control of the behavior and interaction of the four modules, numerous changes can be made to the above described embodiment including the use of equivalent means, devices and method steps without departing from the spirit of the invention.

We claim:

1. A method of predictive maintenance of a plurality of machines by collecting and analyzing vibration data comprising the steps of:
   providing at each of a plurality of stations of a plurality of machines a predetermined electro-optically readable code identifying the vibration data collection station thereon;
   storing in an electronic memory contained within a portable vibration data collection and processing apparatus, addressable machine file data containing preprogrammed data collection and data processing parameters for each of the plurality of data collection stations;

collecting vibration data from each of said stations by temporarily attaching a vibration sensor to an indexing mount at the machine station, reading said code adjacent the data collection station, using said code to address the electronic memory for retrieving machine file data stored for each of such stations and receiving vibration signals from the vibration sensor, conditioning such signals by filtering and converting same in accordance with said predetermined data collection and data processing parameters, into discrete time domain digital data representing machine vibration as a function of time;

transforming said discrete time domain digital data representing machine vibration at each station into frequency domain digital data representing machine vibration in the frequency domain;

temporarily storing said discrete time domain digital data in a common battery powered random access memory with said frequency domain digital data using address areas in opposing storage regions of said common random access memory, and providing said common random access memory with a moving partition means for separating said discrete time domain digital data from said frequency domain digital data; and transferring the stored discrete time domain and/or frequency domain digital data to a host computer for predictive maintenance analysis of such data.

2. A portable vibration data collection and processing apparatus for predictive maintenance of a plurality of machine stations by collecting, processing and storing vibration data, comprising:

central control module having a microprocessor means, a memory storing a control program for said microprocessor means, and a random access memory for storing digital machine file data on each of the plurality of machine stations;

code reading means for reading a station identification code associated with each station, said code reading means including means for producing a digitally encoded address signal representing said station identification code, said random access memory being responsive to said code reading mean to access said machine file data in response to said digital signal representing said station identification code;

vibration sensor means attached to an indexing mount at each machine station for producing electrical analog signals representing machine vibration at that station;

vibration signal conditioning means for filtering the electrical analog signals produced by said vibration sensor means and for converting the filtered electrical analog signals into digital time domain vibration data representing machine vibration as a function of time;

a data processing module having a memory for storing a control program controlling the operation of said microprocessor means, and a random access memory, said data processing module operating in response to its control program stored in memory to transform said digital signals representing vibration as a function of time into frequency domain vibration data, said memory of said data processing module serves as a scratch pad memory for temporary storage of said digital time domain data during said transform;

a serial bus for communicating control and data signals between said central control module and said data processing module;

input/output interface means coupling said serial bus to each of said module; and vibration data memory means for storing said frequency domain vibration data and/or said time domain vibration data and corresponding machine file data for subsequent predictive maintenance analysis of such data.

3. A portable vibration data collection and processing apparatus for predictive maintenance of a plurality of machines by collecting, processing and storing of vibration data, comprising:

central control module having first microprocessor means, a memory storing a control program for said first microprocessor means and a random access memory for providing file memory means for storing digital machine file data on the plurality of machines;

code reading means for reading a preprogrammed station identification code adapted to be affixed to each station, said code reading means including means for producing a digitally encoded address representing said station identification code, said file memory means being responsive to said code reading means to access said file data in response to said digital signal representing said station identification code;

vibration sensor means adapted to be attached to an indexing mount at each station for producing electrical analog signals representing machine vibration;

vibration signal conditioning means for filtering the electrical analog signals produced by said vibration sensor means and for converting the filtered electrical analog signals into digital signals representing machine vibration as a function of time;

a data processing module having a second microprocessor means and a memory for storing a program controlling an operation of said second microprocessor means for transforming said digital signals representing vibration as a function of time into frequency domain vibration data, said memory of said data processing module serves as a scratch pad memory during said transforming;

a serial bus for communicating control and data signals between said central control module and said data processing module;

input/output interface means coupling said serial bus to each of said modules; and vibration data memory means for storing said time domain and/or frequency domain vibration data and corresponding machine file data for subsequent predictive maintenance analysis of such data.

4. The apparatus of claim 3 wherein said serial bus is a single conductive line and said input/output interface means comprises:

a receiving lead connected from said single conductive line to a binary data receiving port on each of said central control and data processing modules; and a buffered transmitting circuit including a pair of cascaded, opposite polarity transistors connected from a binary data transmitting port on each of said central control and data processing modules to said single conductive line.

vibration data memory means for storing said frequency domain vibration data and corresponding machine file data for subsequent predictive maintenance analysis of such data.

5. The apparatus of claim 4 wherein said vibration data memory means further comprises a data memory module having a third microprocessor means, a read only memory storing a program for controlling said third microprocessor means and a battery operated dynamic random access storage memory for storing said time domain and said frequency domain vibration data; said serial bus and said input/output interface means are coupled to said data memory module for communicating control and digital data to and from said data memory module.

6. The apparatus of claim 5 wherein said random access storage memory of said data memory module was addressable storage area from lowest end to highest end addresses, and means for loading said time domain data into memory from one end of said addresses and loading said frequency domain data into memory from the opposite end of said addresses.

7. The apparatus of claim 3 wherein said vibration signal conditioning means comprises a vibration signal module having a microprocessor, a read only memory storing a program for controlling the operation of such microprocessor and a random access memory; said serial bus and said input/output interface means are coupled to said vibration signal module for communicating control and data signals between said serial bus and vibration signal module.

* * * * *